REEL MECHANISM FOR MAGNETIC RECORDERS

Filed April 18, 1952 3 Sheets-Sheet 1

INVENTOR.
Calhoun Norton
BY
Moore, Olson & Trexler
Attys.

Oct. 30, 1956 C. NORTON 2,768,795

REEL MECHANISM FOR MAGNETIC RECORDERS

Filed April 18, 1952 3 Sheets-Sheet 2

INVENTOR.
Calhoun Norton
BY
Moore, Olson & Trexler
attys.

INVENTOR.
Calhoun Norton
BY
Moore, Olson & Trexler
Attys.

United States Patent Office 2,768,795

Patented Oct. 30, 1956

2,768,795

REEL MECHANISM FOR MAGNETIC RECORDERS

Calhoun Norton, Evanston, Ill., assignor to Arens Controls, Inc., Evanston, Ill., a corporation of Illinois Application April 18, 1952, Serial No. 282,928

5 Claims. (Cl. 242—55)

This invention relates to tape and wire recorders, and the like, and concerns particularly reel devices and mechanisms therefor.

One type of sound recorder currently in use employs an elongated filament such as a tape or wire, upon which the sound track is suitably impressed; the instrument being adapted either to impress a sound track into the tape or wire from a source of sound for record purposes, or to reproduce, in the form of sound, from a previously impressed tape or wire sound track. These instruments conventionally comprise a tape or wire handling part or device, including storage reels for the tape or wire and associated feeding means; and an electronic amplifier which frequently is provided as a separate unit within its own case or mounting.

Tape or wire recorders, as above, have certain advantages when compared with disc-type recorders, such as minimized "scratch," and the capability that the tape or wire may be readily re-used through a simple electric erasing of a previously recorded track. On the other hand, tape and wire recorders present the disadvantage that the tape and wire handling mechanisms are frequently complex and difficult to manage. It is essential, for sound clarity and fidelity, that the tape or wire be transmitted through the machine at a certain minimum speed. This factor limits the length of program which can be recorded, to the length of the tape or wire which can be conveniently handled by the machine.

Heretofore it has been the general practice in tape and wire recorders to provide storage reels for the tape or wire handling mechanism of such size as to provide the maximum possible storage capacity without the undue enlargement of the parts. This practice, however, is necessarily a compromise, viz., in instances wherein the full capacity of the reels is not required, they are unnecessarily large, whereas in other instances these same reels may be found to be unduly small in relation to the requirements at hand. One attempt to overcome the problem, which has heretofore been made, involves the provision of separate filament handling machines incorporating reels of different size; but this has the disadvantage of excessive cost, and the multiple handling mechanisms increase the weight and bulk of the parts which may be of great disadvantage, in the case of a portable installation.

The foregoing difficulties are particularly present in the case of tape recorders, as distinguished from wire recorders, due to the greater bulk of the tape in respect to the reel size.

In accordance with the present invention a dual reel mechanism is provided for tape and wire recorders, and particularly for tape recorders, by means of which a single tape handling mechanism of the device, including its motors and winding appurtenances, may be readily used with different size storage reels for the tape, whereby the single machine may be readily adapted for different length programs. By this means the machine may be made small and compact, for normal service, while at the same time being readily adapted to the recording of programs of increased length, by simple and readily effected adaptations, when occasion requires.

It is accordingly an object of the present invention to provide an improved recorder employing an elongated filament such as a tape or wire; and particularly to provide an improved tape recording machine, having increased adaptability in respect to the tape storage capacities of the machine.

More particularly stated, it is an object of the invention to provide an improved tape recorder having reel mounting devices, so constructed and arranged, as to adapt the machine for the use of tape storage reels of different size, in accordance with requirements, while using a single tape feeding mechanism.

A further object of the invention is to provide an attachment device, for magnetic filament recorders of the type above set forth, whereby reels of greater size may be readily applied to and driven from the filament handling and driving mechanisms of the unit.

Various features, advantages, and more specific objects of the invention will appear from the following specification, when taken in connection with the accompanying drawings, wherein certain preferred embodiments of the invention are set forth for purposes of illustration.

In the drawings, wherein like reference numerals refer to like parts throughout:

As previously indicated, the invention is adapted for use in sound recorders and the like using filaments of various types and kind, but has particular utility as applied to tape recorders wherein the sound track filament is of greater bulk, and has been so illustrated in the embodiments set forth.

Figures 1, 2, 3, 4, 5, 6:
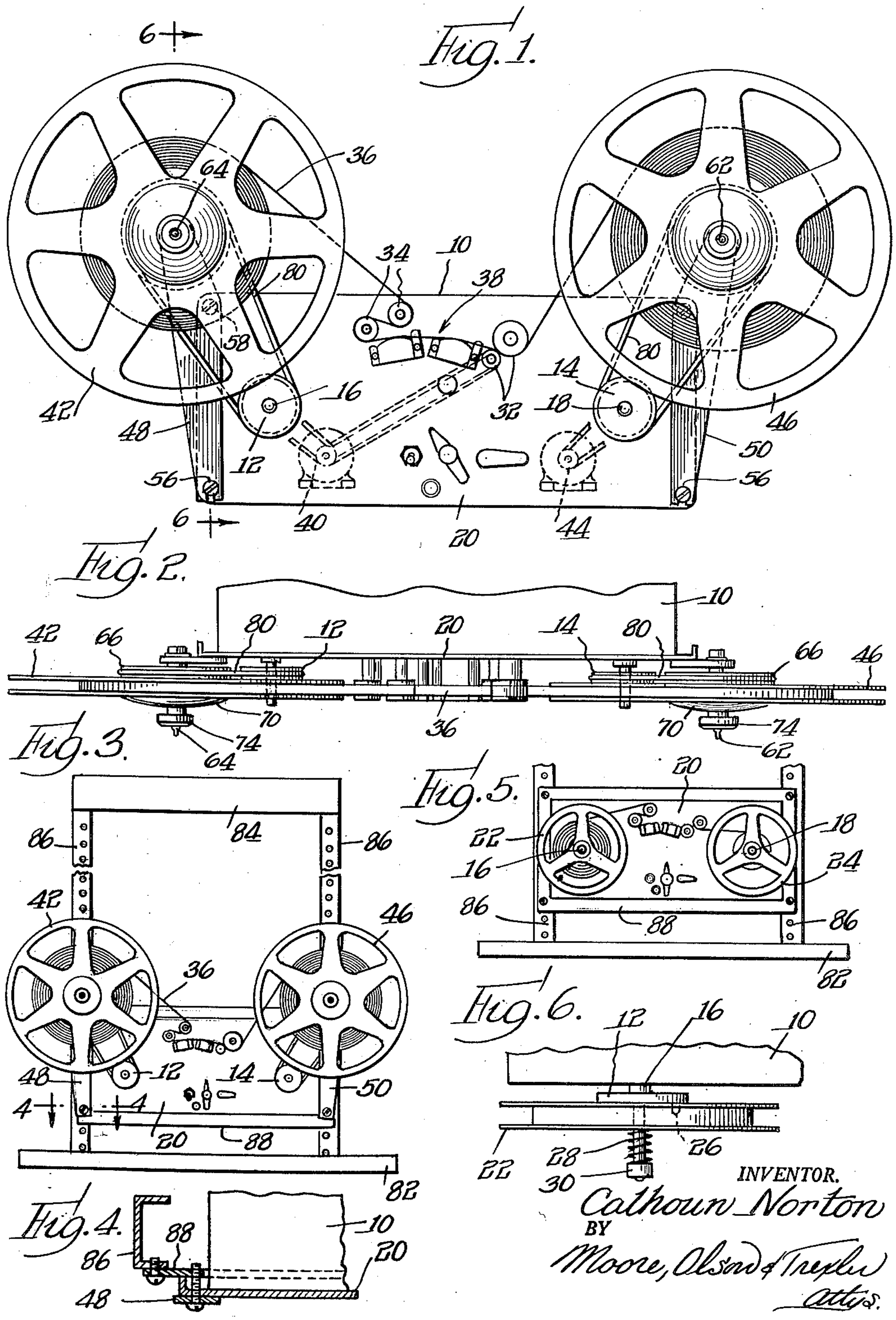
Fig. 1 is a front elevational view of a tape recorder, constructed in accordance with and embodying the principles of the present invention, in accordance with one preferred embodiment thereof.
Fig. 2 is a partial plan view of the structure shown in Fig. 1.
Fig. 3 is an assembly view, showing a recorder incorporating the invention, utilized in connection with a mounting rack.
Fig. 4 is a detail sectional view showing a part of the rack structure of Fig. 3, on the line 4—4 thereof.
Fig. 5 is a view, similar to Fig. 3, but showing the recorder utilizing smaller reels, of lesser capacity, as compared with the reels of Figs. 1–3.
Fig. 6 is a detail sectional view, showing the manner of mounting the reels, as in Fig. 5.

Referring more particularly to the drawings, and first to the embodiment of Figs. 1–11 thereof, in Fig. 1 a magnetic tape recorder is illustrated, provided as an independent portable unit, and incorporating the reel mounting devices enabling the use of reels of larger size.

More particularly, the instrument shown comprises a portable casing 10, adapted for use with any suitable electronic amplifier and microphone-speaker unit (not shown), by means of which magnetic sound records may be recorded upon tape, or reproduced therefrom.

Magnetic recorder tape handling units of this type conventionally comprise a pair of back-up discs 12 and 14, mounted upon shafts 16 and 18, respectively, projecting through the front face plate 20 of the unit.

When the recorder unit is used with reels of smaller size, as illustrated in Fig. 5, the reels 22 and 24, which may for example be seven inch reels in such instance, are mounted directly upon the shafts 16 and 18, and held in position against the back-up discs 12 and 14, respectively, and driven thereby. Thus referring to Fig. 6, showing a detail view of the drive for the reel 22, it will be seen that the disc 12 is provided with a drive pin 26 projecting through a portion of the reel 22 in driving engagement therewith, the reel being held against the back-up disk by a compression spring 28 encompassing the shaft 16, and urged against the reel by a thumb nut 30 removably held on the end of shaft 16 by a bayonet pin and slot connection, or the like.

Referring further to Fig. 1, the recorder casing or unit 10 further includes drive pulleys 32, and guide pulleys 34, by means of which the magnetic tape 36 is transmitted between the reels, and through the recorder sensing mechanism generally indicated by the numeral 38. In a representative recorder, which may be taken as illustrative, a shaft motor 40 is provided within the casing for driving the rolls 32 during recording operations, so as to withdraw the tape from the pay-off reel 42. During such operation friction devices (not shown) within the casing apply a predetermined frictional drag to the shaft 16; and the motor 44, also provided within the casing, is in driving engagement with the take-up reel 46 through suitable friction drive connections (not shown) between the motor 44 and the shaft 18. These latter connections are such that the take-up reel is driven at a speed somewhat greater than the lineal driving speed of the rolls 32, so as to maintain the tape 36 under slight tension as it moves onto the take-up reel. For rewinding operations the motor 40 is declutched from the drive rolls 32, and clutched to the shaft 16, so as to drive the reel 42 at rapid rewind speed, and during such rewinding operations motor 44 is declutched from shaft 18, and suitable friction mechanism in association with the shaft applies a slight drag to the reel 46 during the rewind so as to maintain the tape under tension.

In accordance with the present invention, shafts 16 and 18 and their associated discs 12 and 14, respectively, are used not only for driving the smaller reels 22 and 24 of Figs. 5 and 6, but also the larger reels 42 and 46, as hereinbefore referred to in connection with Fig. 1. Such larger reels may be, for example, ten inch reels in the embodiment shown.

Figures 7, 8, 9, 10, 11:
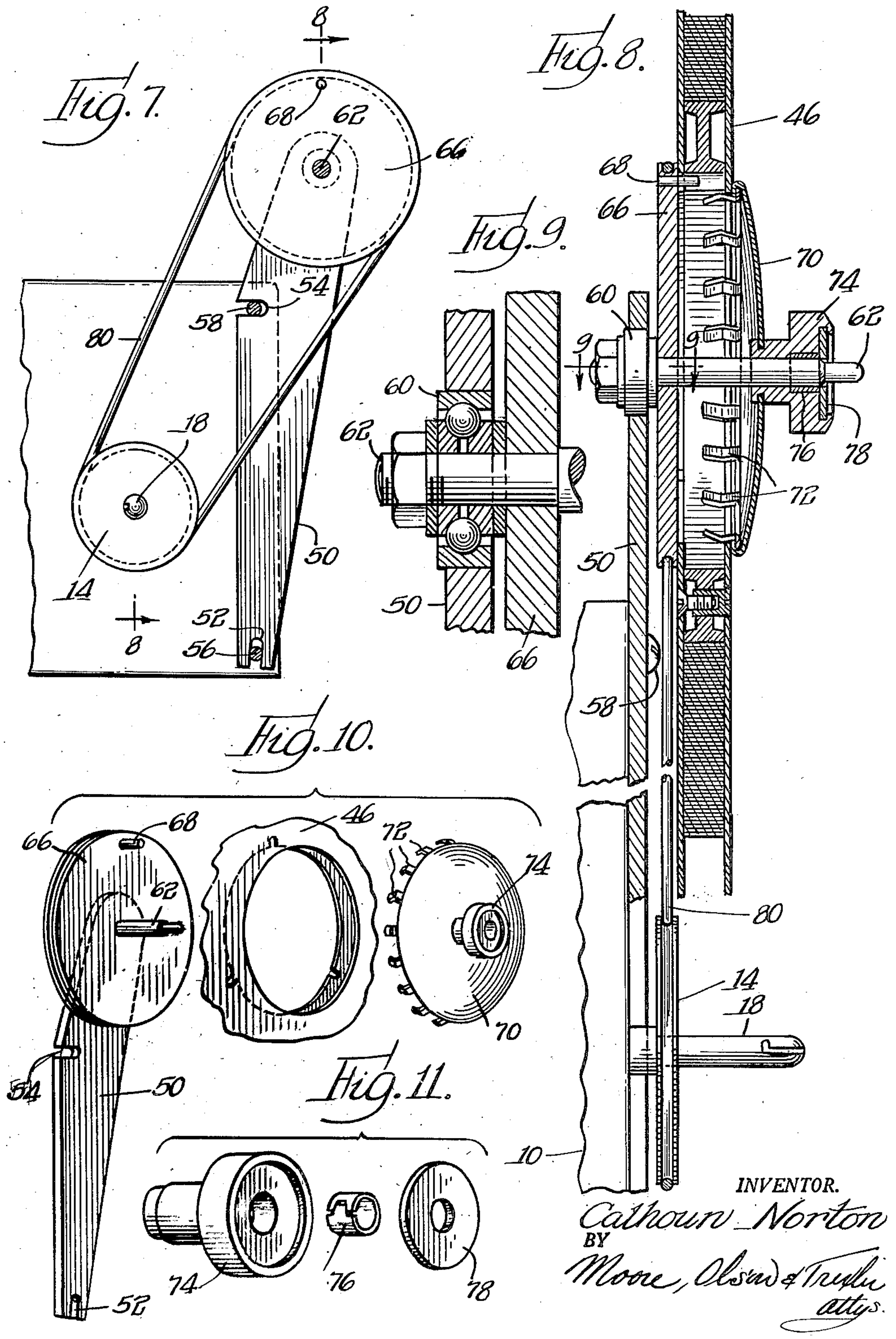
Fig. 7 is an enlarged detail view, more particularly illustrating one of the attachment arms, for the larger reels.
Fig. 8 is a sectional view of the structure of Fig. 7, on a further enlarged scale, and taken as indicated by the line 8—8 of Fig. 7.
Fig. 9 is a detail sectional view, on a still further enlarged scale, taken as indicated by the line 9—9 of Fig. 8, and more particularly illustrating a part of the bearing structure forming a part of the attachment arm structure.
Fig. 10 is an exploded view showing the attachment arm and certain associated parts.
Fig. 11 is an exploded view, showing certain additional parts carried by and associated with the attachment arm.

To this end, in accordance with the present invention, and referring further to Fig. 1, and to Figs. 7–11, it will be seen that there is provided, respectively, for each of the shafts 16 and 18, a pair of arms or brackets 48 and 50 for removably supporting the reels 42 and 46 from the casing 10. More particularly, as shown in Fig. 7, the arms are provided with notches 52 and 54 arranged to be engaged by casing bolts 56 and 58 so as to hold the arms removably in position. As shown in Figs. 8 and 9, each arm has press-fitted into its upper end the outer race of an antifriction bearing 60, the inner races of these bearings carrying the support shafts 62 and 64 for the reels. As further shown in Figs. 8 and 9, in reference to the support shaft 62, each shaft is shouldered to provide support for a backup disc 66, against the outer face of which the reels, 42 or 46 as the case may be, are drivingly engaged. To this end, each backup disc is provided with a drive pin 68 for drivingly engaging the reels, as in the case of the backup discs 12 and 14 previously described.

Referring further to Fig. 8, and to Figs. 10 and 11, to hold the reels against the backup discs removable spring clips 70 are employed, these clips having spring fingers 72 arranged to engage the central recesses of the reels, and thus hold them properly centered in respect to their support shafts. Fixed to each clip 70 is a knob or handle 74. This knob has a central recess carrying a spring collar 76 resiliently embracing the support shaft, the collar being retained within the knob or handle 74 by a retention disc 78.

By reason of the connections described, the reels 42 and 46 may be removably mounted upon their respective support and drive shafts 64 and 62 by mounting the reels upon the shafts, and then pressing the clips 70 into retaining position. As the clip reaches the position shown in Fig. 8, the spring collar 76 associated therewith grips the support shaft to hold the parts frictionally in position. To remove the clips 70 it is necessary merely to pull the handle 74 longitudinally of the shafts, the operator holding his thumb against the shaft end, until the spring collar 76 reaches the end of the shaft which is of reduced diameter, whereupon the parts may be freely removed. As will be understood, the shafts 64 and 62 are permanently mounted on their respective support arms 48 and 50, by means of the antifriction bearing mountings provided.

The backup discs 66 for the reels, and also the smaller backup discs 12 and 14, are provided with grooves accommodating drive belts 80, by means of which the larger reels 42 and 46 are driven from the instrument shafts 16 and 18, as in the case of the smaller reels 22 and 24 previously described.

As will be noted, particularly from Fig. 2, the drive and mounting structures for the reels are relatively shallow or flat, lying substantially in the plane of the front face of the casing. By this means the structures are adapted for use with mounting racks and the like, upon which recording devices and mechanisms are frequently mounted. Thus in Fig. 3 there is shown an instrument mounting rack comprising a base 82, an upper cross bar 84, and upstanding support channels 86, one of which is shown in cross section in Fig. 4. In mounting the instrument upon the support rack, the front panel 20 of the casing is bolted to an adapter frame 88 which is in turn secured to the uprights 86. It will be seen that the support arms, such as the arm 48, are arranged in such manner, with their associated parts so as to lie substantially flatwise slightly forwardly of the face plate 20, enabling the reels 42 and 46 to lie forwardly of but substantially adjacent the uprights.

In Fig. 5 the instrument is shown mounted on the rack, with its smaller tape reels, as previously described.

The tension for the drive belts 80 can be readily adjusted by pivoting the support arms 48 and 50 on the bolts 56, after loosening of bolts 58, as will be understood. By reason of the fact that the backup discs or pulleys 66 are larger than their associated drive pulleys 12 and 14, a torque step-up arrangement is provided enabling the motors 40 and 44 to handle the larger reels 42 and 46 with the same facility as the smaller reels 22 and 24. By this means the same motors and friction drive and drag devices within the instrument may be employed with equal facility for both sets of reels, which is an important advantage in the use of the structure. The arms or brackets 48 and 50 are quickly detachable, to adapt the instrument to either size reel with the use of a single tape drive mechanism.

Figure 12:
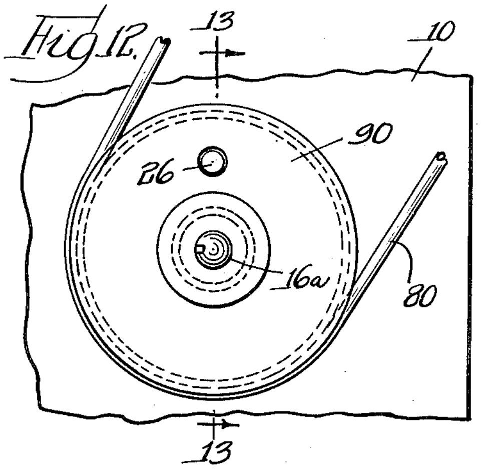
Fig. 12 is a view illustrating a modified form of the invention.
Figure 13:
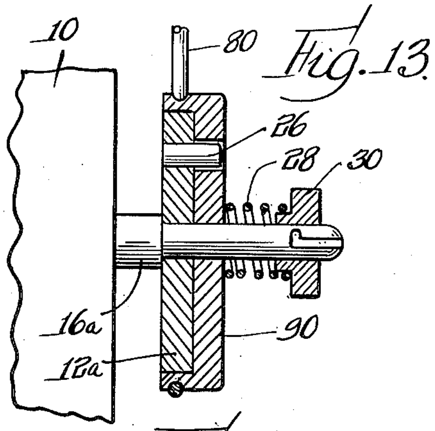
Fig. 13 is a sectional view of the structure of Fig. 12 on the line 13—13 thereof.
Figures 14, 15, 16, 17:
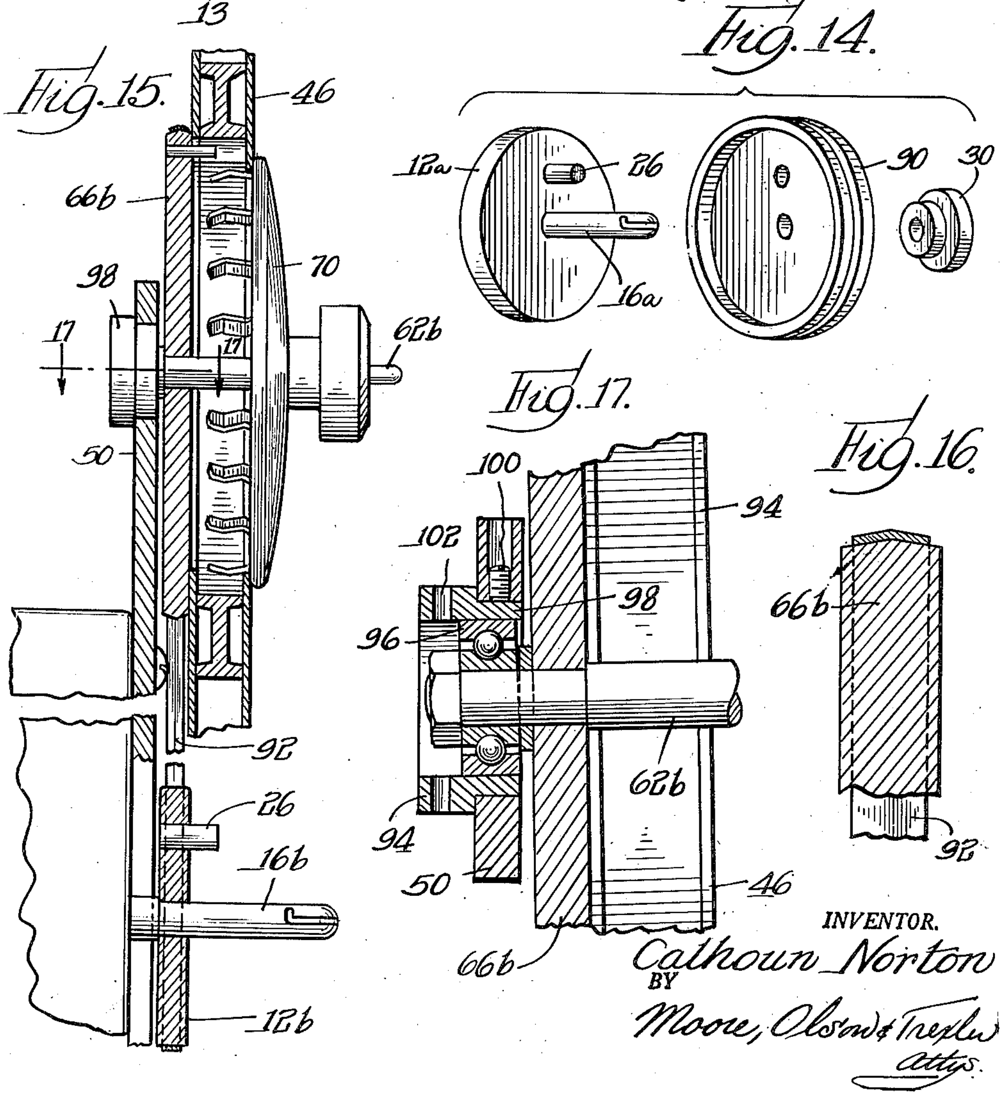
Fig. 14 is an exploded view of certain of the parts of the structures of Figs. 12 and 13.
Fig. 15 is a sectional view, generally similar to Fig. 8, but illustrating a still further modified form of the invention.
Fig. 16 is a detail view of a pulley wheel, forming a part of the structure of Fig. 15.
Fig. 17 is a view more particularly showing the adjustable mounting for the reel support shaft, in the structure of Fig. 15, on the line 17—17 thereof.

In Figs. 12–14, an arrangement is provided, particularly adapted for use with instrument backup discs wherein, for one reason or another, the use of grooves for the drive belts is not desirable. Thus, referring to Figs. 12 and 13, it will be seen that in this instance, the drive shaft 16*a*, corresponding in function and purpose with the drive shaft 16 previously described, has fixed thereon a backup disc 12*a* which is flat on its outer peripheral surface, and which thus may not be properly adapted for use with a drive belt; although the disc may be properly used as a backup disc for the smaller reels, as in the case of the corresponding disc 12, previously described.

In the structures of Figs. 12–14 an auxiliary pulley or member 90 is fitted over the disc 12*a*, and arranged to be driven by the drive pin 26. The pulley member 90 is held on the shaft 16*a* by means of the compression spring 28 and bayonet slot thumb nut 30 in the same manner as the small reel is held in position, as previously described in reference to Fig. 6. The peripheral or flange portion of the plate member 90 is formed with a suitable groove for receiving and driving the belt 80, by means of which the larger reels are driven. It will be seen that by reason of the structures thus provided, backup discs, such as the disc 12*a*, may be adapted to effect the driving of the larger reels.

In Figs. 15–17 a further embodiment of the invention is illustrated. In this instance the shaft 16*b*, corresponding structurally and functionally to the shafts 16 and 16*a* previously described, is provided with a pulley or backup disc 12*b* which is flat as in the case of the disc 12*a* previously described. However, the associated pulley or backup disc 66*b* is in this instance provided with a crowned surface for cooperation with a flat driving belt 92. By reason of the crown on the pulley 66*b* the drive belt is maintained in proper driving position, as will be understood. The arrangement thus provides a drive for a flat or ungrooved disc 12*b*, without the use of an adapter plate, such as illustrated at 90 in Fig. 13.

In certain instances it becomes desirable to adjust the reels so that the tape will not inadvertently rub against the reel flanges, in the operation of the instrument.

Due to the relatively shallow character of the drive structures it is not expedient to effect an endwise adjustment of the reel, such as the reel 46, upon its support shaft. However, in accordance with the structure shown in Fig. 17, the desired adjustment for proper operation is effected by tilting the reel support shaft slightly in respect to its support arm. By this means the tape can be kept from inadvertent scraping against the flanges of the reel. Thus, referring to Fig. 17, the reel support shaft, designated in this instance as 62*b*, is mounted within the arm 50 by means of a rotatably adjustable sleeve member or collar 94, the inner bore 96 of which is angularly displaced from its outer cylindrical surface 98 a suitable small amount, for example two degrees. The angularity is shown slightly exaggerated in Fig. 17. The collar 94 is mounted within the arm 50 by means of its cylindrical surface 98, being held in position by a set screw 100; whereas the sleeve bore 96 forms the support for the outer race of the antifriction shaft support bearing. By loosening the set screw 100 the sleeve member 94 may be rotationally adjusted by means of the wrench gripping openings 102. Such rotational adjustment will shift the reel support shaft 62*b* slightly angularly in respect to the support arm 50, whereby to effect an angular adjustment of the associated reel 46, to facilitate proper operation of the tape. By means of the set screw 100 the sleeve may be locked in any desired position of rotational adjustment, a maximum angularity shift of four degrees being effected by a two degree offset between the sleeve surfaces. As will be understood, the mounting arrangements of Fig. 17 may be employed with any type of associated drive pulleys, as for example in the embodiment of Figs. 1–11.

It is obvious that various changes may be made in the specific embodiments set forth without departing from the spirit of the invention. The invention is accordingly not to be limited to the particular embodiments shown and described, but only as indicated in the following claims.

The invention is hereby claimed as follows:

1. A reel attachment for sound recorders of the type having a housing and means for feeding an elongated filament carrying a sound track for the reproduction of sound, said attachment comprising a pair of arm brackets each having a pair of fastener receiving openings, at least one of each pair of openings being elongated and opening along an edge of its bracket, means including fasteners received in said openings removably mounting the arm brackets on said housing, a pair of spindles rotatably attached to said arm brackets, driving means for said spindles, and a pair of filament reels, means removably attaching the reels to said spindles so that while attached they will rotate at the same angular velocity as the spindles on which they are attached, said reel attachment being completely supported by said sound recorder.

2. A reel attachment for sound recorders as defined in claim 1, wherein the position of said brackets with respect to said housing is adjustable by relatively adjusting the position between a fastener and an associated elongated opening.

3. A reel attachment for sound recorders as defined in claim 1 wherein means is provided for adjusting the angularity of the spindles relative to their supporting arm brackets to allow movement of the tape from said reels without scraping the walls of said reels, said adjusting means including sleeves of which the axes of the inner and outer surfaces are skewed.

4. A reel attachment for sound recorders of the type having a housing and means for feeding an elongated filament carrying a sound track for the reproduction of sound, said attachment comprising a pair of arm brackets each having a pair of fastener receiving openings with at least one of each pair of openings being elongated and opening along an edge of its bracket, means including fasteners received in said openings for removably mounting the arm brackets on said housing, a pair of spindles carried by said arm brackets, a pair of filament reels, means removably attaching the reels to said spindles, and driving means to effect rotation of said reels, said reel attachment being completely supported by the sound recorder.

5. A reel attachment for sound recorders of the type having a housing and means for feeding an elongated filament carrying a sound track for the reproduction of sound, said attachment comprising bracket means including arms projecting exteriorly of the housing, said bracket means including fastener receiving openings, means including fasteners received in said openings for removably attaching the bracket means on said housing with the ends of the arms disposed exteriorly thereof, a pair of spindles attached to the exteriorly disposed ends of said arms, a pair of filament reels removably attached to said spindles, drive means for rotating said reels, said reel attachment being completely supported by the sound recorder.

References Cited in the file of this patent

UNITED STATES PATENTS

| | | |
|---|---|---|
| 1,899,052 | Owens | Feb. 28, 1933 |
| 2,005,096 | Mallickson | June 18, 1935 |
| 2,087,863 | Sharp | July 20, 1937 |
| 2,218,256 | Bechtel | Oct. 15, 1940 |
| 2,256,899 | Greenwood | Sept. 23, 1941 |
| 2,501,055 | Hume | Mar. 21, 1950 |
| 2,652,204 | Haynes | Sept. 15, 1953 |